US011095925B2

(12) United States Patent
Jang

(10) Patent No.: US 11,095,925 B2
(45) Date of Patent: Aug. 17, 2021

(54) ARTIFICIAL INTELLIGENCE BASED RESOLUTION IMPROVEMENT SYSTEM

(71) Applicant: GDFLAB CO., LTD., Seoul (KR)

(72) Inventor: Kyoung Ik Jang, Incheon (KR)

(73) Assignee: GDFLAB CO., LTD., Seoul (KR)

( * ) Notice: Subject to any disclaimer, the term of this patent is extended or adjusted under 35 U.S.C. 154(b) by 0 days.

(21) Appl. No.: 17/050,371

(22) PCT Filed: Apr. 23, 2019

(86) PCT No.: PCT/KR2019/004890
§ 371 (c)(1),
(2) Date: Oct. 23, 2020

(87) PCT Pub. No.: WO2019/209005
PCT Pub. Date: Oct. 31, 2019

(65) Prior Publication Data
US 2021/0058653 A1    Feb. 25, 2021

(30) Foreign Application Priority Data

Apr. 24, 2018  (KR) .......................... 10-2018-0047305
Apr. 22, 2019  (KR) .......................... 10-2019-0046953

(51) Int. Cl.
*H04N 21/234* (2011.01)
*G06K 9/00* (2006.01)
(Continued)

(52) U.S. Cl.
CPC ... *H04N 21/23418* (2013.01); *G06K 9/00744* (2013.01); *G06K 9/00765* (2013.01);
(Continued)

(58) Field of Classification Search
CPC ..... H04N 21/23418; H04N 21/234363; H04N 21/2393; H04N 21/2408; H04N 21/241;
(Continued)

(56) References Cited

U.S. PATENT DOCUMENTS 5,293,454 A  *  3/1994  Kamiya ............... G06K 9/6256
                                                    706/25
2016/0328630 A1  11/2016  Han et al.
(Continued)

FOREIGN PATENT DOCUMENTS

| CN | 106791927 A | 5/2017 |
| KR | 10-2016-0131848 A | 11/2016 |
| KR | 10-1780057 B1 | 9/2017 |

*Primary Examiner* — Nicholas T Corbo
(74) *Attorney, Agent, or Firm* — Maschoff Brennan

(57) ABSTRACT

A resolution improvement system includes a server, for performing, in response to a user device side request, a service for transmitting requested video data to a user device. A universal neural network file required for operation of an artificial neural network algorithm for improving the resolution of image information on the basis of the retained video data is generated, and the low-quality video data in which the generated universal neural network file and the resolution are changed to less than or equal to a preset level is transmitted to the user device. A user device performs a calculation operation on the basis of an artificial neural network algorithm that applies the received universal neural network file to the low quality video data received from the server, improving the resolution of the low quality video data according to the calculation operation, and playing back the video data with improved resolution.

10 Claims, 9 Drawing Sheets

(51) Int. Cl.
    *G06N 3/04* (2006.01)
    *G06N 3/08* (2006.01)
    *H04N 21/239* (2011.01)
    *H04N 21/24* (2011.01)
    *H04N 21/25* (2011.01)
    *H04N 21/4402* (2011.01)
    *H04L 29/06* (2006.01)
    *H04N 21/2343* (2011.01)

(52) U.S. Cl.
    CPC .............. *G06N 3/04* (2013.01); *G06N 3/08* (2013.01); *H04L 65/60* (2013.01); *H04N 21/2393* (2013.01); *H04N 21/234363* (2013.01); *H04N 21/2408* (2013.01); *H04N 21/251* (2013.01); *H04N 21/4402* (2013.01)

(58) Field of Classification Search
    CPC ...... H04N 21/4402; H04L 65/60; G06N 3/04; G06N 3/08; G06K 9/0744; G06K 9/00765
    See application file for complete search history.

(56) References Cited

U.S. PATENT DOCUMENTS

2017/0346865 A1    11/2017  Hartman et al.
2017/0347061 A1*   11/2017  Wang .................... G06T 3/4046

* cited by examiner

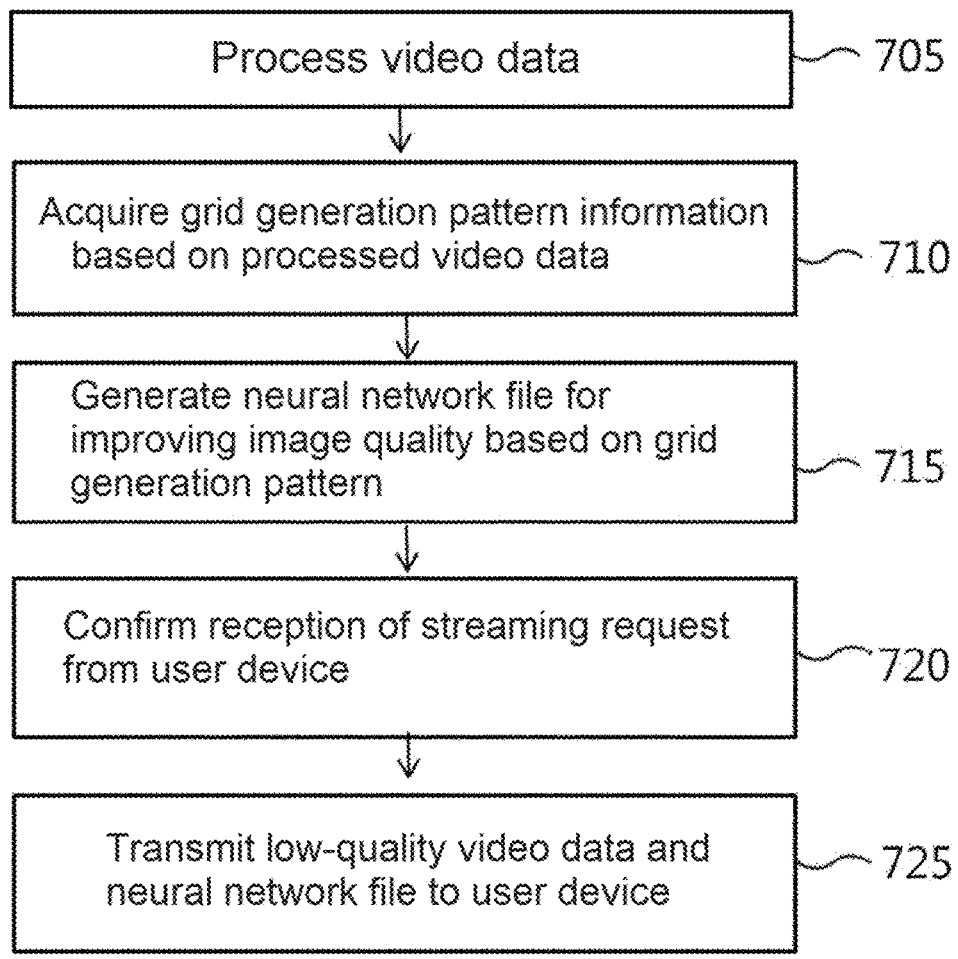

ARTIFICIAL INTELLIGENCE BASED RESOLUTION IMPROVEMENT SYSTEM

TECHNICAL FIELD

The present invention relates to a system for providing a service for improving a resolution based on artificial intelligence. More particularly, the present invention relates to a system for extracting information on a grid generated when an image size is reduced, removing a grid of low-quality image data based on the information on the grid, and restoring a resolution to obtain high-quality image data.

BACKGROUND ART

In order to improve a resolution of image data, various approaches such as an interpolation technique and a machine learning technique have been made. Recently, research using a deep learning technique has been actively conducted in the field of pattern recognition such as video recognition/analysis. In addition, a technology using deep learning has been proven to outperform a learning-based machine learning technique in an upscaling scheme that is one scheme in the field of video quality improvement.

DETAILED DESCRIPTION OF THE INVENTION

Technical Problem

An object of the present invention is to process video data in real time without occupying a large amount of memory.

An object of the present invention is to easily perform resolution improvement regardless of a type of contents through a deep learning-based universal neural network file.

Technical Solution

According to an embodiment of the present invention, a resolution improvement system includes: a server for performing a service for transmitting requested video data to a user device in response to a request from the user device, generating a universal neural network file required for an operation of an artificial neural network algorithm for improving a resolution of image information based on retained video data, and transmitting the generated universal neural network file and low-quality video data, which has a resolution changed to a preset level or less, to the user device; and the user device for performing a computation operation based on the artificial neural network algorithm in which the received universal neural network file is applied to the low-quality video data received from the server, improving the resolution of the low-quality video data according to the computation operation, and playing back the video data with improved resolution.

Advantageous Effects of the Invention

According to an embodiment of the present invention, even when low-quality data is transmitted from a video data providing side, a resolution can be improved based on a neural network file when a corresponding video is played back, so that an environment basis for performing data transmission and reception with low-quality data instead of high-quality data can be provided. Accordingly, according to the present invention, a transmission speed reduction problem that occurs when high-quality video data having a high capacity is transmitted can be solved.

In addition, according to the present invention, even when only a low-quality video is retained, the low-quality image can be converted into a high-quality image through a neural network file at the time of execution of the video, so that a relatively small amount of memory can be occupied.

DESCRIPTION OF THE DRAWINGS

FIG. 9 is a view showing a process of generating and transmitting a neural network file for improving image quality according to an embodiment of the present invention.

BEST MODE

Figure 1:
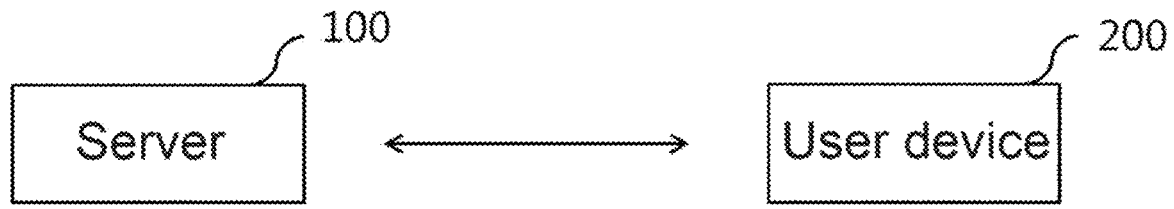
FIG. 1 is a view showing a resolution improvement system according to an embodiment of the present invention.

According to an embodiment of the present invention, a resolution improvement system includes: a server for performing a service for transmitting requested video data to a user device in response to a request from the user device, generating a universal neural network file required for an operation of an artificial neural network algorithm for improving a resolution of image information based on retained video data, and transmitting the generated universal neural network file and low-quality video data, which has a resolution changed to a preset level or less, to the user device; and the user device for performing a computation operation based on the artificial neural network algorithm in which the received universal neural network file is applied to the low-quality video data received from the server, improving the resolution of the low-quality video data according to the computation operation, and playing back the video data with improved resolution.

MODE FOR INVENTION

Since various modifications can be made to the present invention, and various embodiments of the present invention can be provided, and specific embodiments will be illustrated in the drawings and described in detail.

This, however, is by no means to restrict the present invention to the specific embodiments, and shall be construed as including all modifications, equivalents, and substitutes within the idea and scope of the present invention. In describing each drawing, like reference numerals have been used for like elements.

When one element is described as being "connected" or "accessed" to another element, it shall be construed as being directly connected or accessed to the other element but also as possibly having another element in between. Meanwhile, when one element is described as being "directly connected" or "directly accessed" to another element, it shall be construed that there is no other element in between.

Terms used herein are intended to describe specific embodiments only, and shall by no means restrict the present invention. Unless the context explicitly dictates otherwise, expressions in a singular form include a meaning of a plural form. In the present disclosure, the term such as "comprising" or "including" is intended to designate the presence of characteristics, numbers, steps, operations, elements, parts, or combinations thereof described in the specification, and shall not be construed to preclude any possibility of presence or addition of one or more other characteristics, numbers, steps, operations, elements, parts, or combinations thereof.

FIG. 1 is a view showing a resolution improvement system according to an embodiment of the present invention.

As shown in FIG. 1, according to an embodiment of the present invention, a resolution improvement system may include a server 100 and a user device 200.

According to one embodiment, the server 100 may include a server for providing a VOD service to the user device 200.

The server 100 may transmit video data to provide the VOD service to the user device 200. In addition, according to the embodiment of the present invention, the server 100 may calculate a neural network file required for improving image quality of the video data, and may transmit the calculated neural network file to the user device 200 together with the video data. Accordingly, the user device 200 may improve the image quality of the video data provided from the server 100 based on the received neural network file.

In addition, the user device 200 may select video data to be transmitted from the server 200, and may request the server 200 to transmit the video data. Further, the user device 200 may calculate user viewing pattern information calculated based on selection information and playback information of the video data of the user device 200, and may transmit the calculated user viewing pattern information to the server 200.

An image quality improvement operation performed by the user device 200 will be briefly described with reference to FIG. 2.

Figure 2:
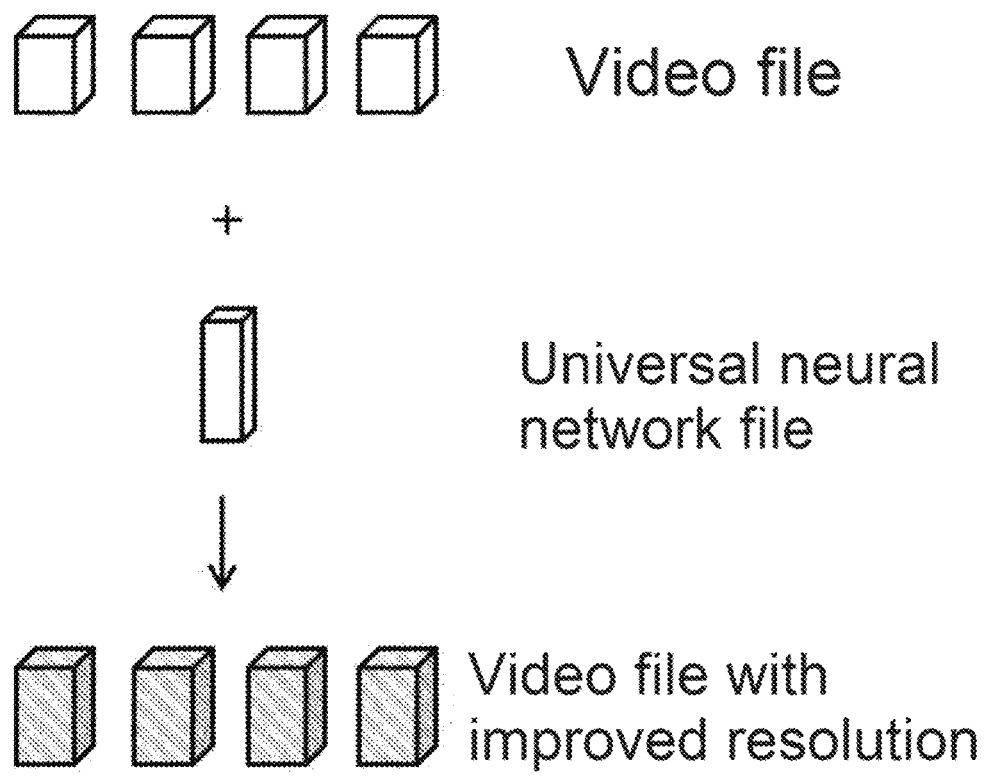
FIG. 2 is a view showing an example of an image quality improvement operation according to an embodiment of the present invention.

FIG. 2 is a view showing an example of an image quality improvement operation according to an embodiment of the present invention.

As shown in FIG. 2, the user device 200 may generate a video file with improved resolution through the neural network file. In this case, according to the embodiment of the present invention, the neural network file may be a universal file that may be used regardless of a type of the video file, so that the neural network file may be combined with any video file transmitted to the user device 200 so as to improve a resolution.

In addition, according to various embodiments, the user device 200 may mount the universal neural network file to embedded software, and may receive a video file, which is an image quality improvement target, from the server 100 (e.g., a video streaming server).

Figure 3:
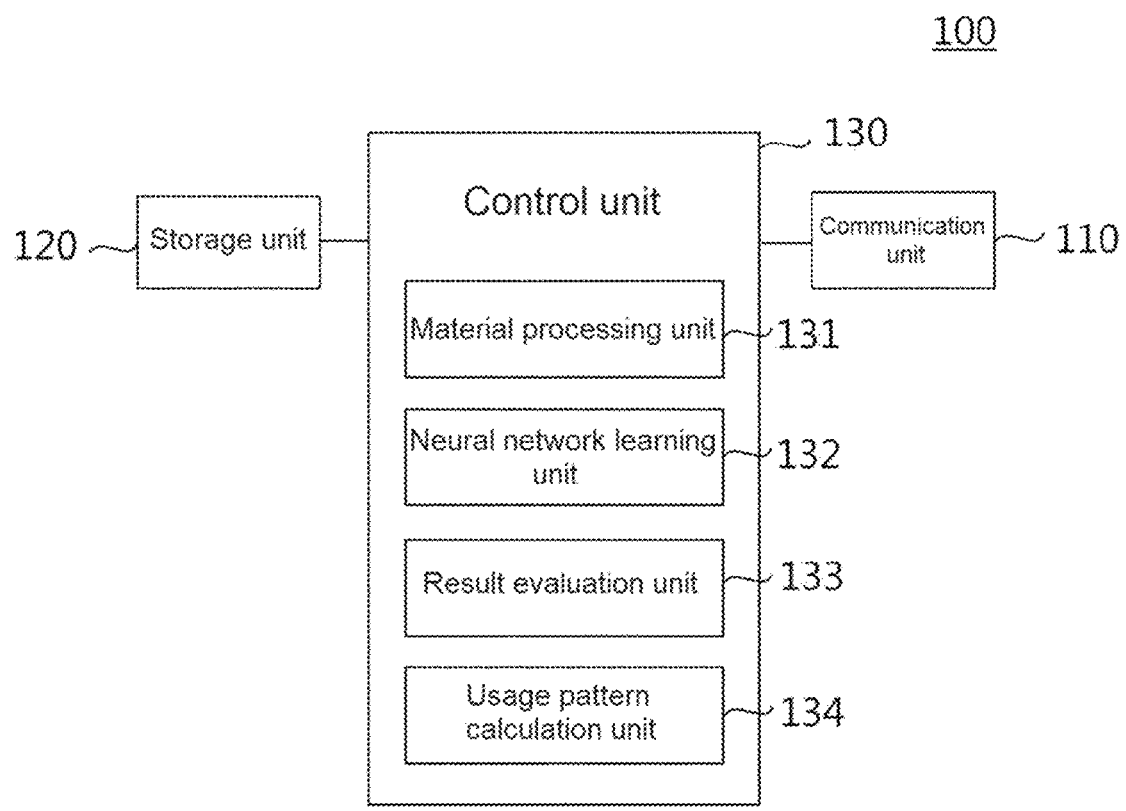
FIG. 3 is a block diagram showing a configuration of a server according to an embodiment of the present invention.

FIG. 3 is a block diagram showing a configuration of a server according to an embodiment of the present invention.

According to the embodiment of the present invention, as shown in FIG. 3, the server 100 may include a communication unit 110, a storage unit 120, and a control unit 130. In addition, the control unit 130 may include a material processing unit 131, a neural network learning unit 132, a result evaluation unit 133, and a usage pattern calculation unit 134.

First, the communication unit 110 may use a network to perform data transmission and reception between the user device and the server, and a type of the network is not particularly limited. The network may be, for example, an Internet protocol (IP) network that provides a service for transmitting and receiving a large amount of data through an Internet protocol (IP), or an All-IP network in which mutually different IP networks are integrated. In addition, the network may be one of a wired network, a wireless broadband (Wibro) network, a mobile communication network including WCDMA, a mobile communication network including a high-speed downlink packet access (HSDPA) network and a long-term evolution (LTE) network, a mobile communication network including LTE advanced (LTE-A) and fifth generation (5G), a satellite communication network, and a Wi-Fi network, or may be a combination of at least one of the above networks.

According to the embodiment of the present invention, the communication unit 110 may perform data communication with an external web server and a plurality of user devices. For example, the communication unit 110 may receive content data (photos and videos) including an image from other web servers or user devices (including administrator devices). In addition, since the server 100 includes the server for providing the VOD service, the server 100 may transmit VOD contents corresponding to a user request to the user device 200.

According to various embodiments, the communication unit 110 may receive and transmit a VOD file for the VOD service, but the embodiments are not limited thereto. The communication unit 110 may perform a communication function for collecting learning data required for generating a neural network file for improving a resolution.

The neural network file may contain information necessary for restoring a resolution of damaged video data through an artificial neural network algorithm so as to be similar to a resolution of original data, and may include information on various parameters that have to be selected when operating the artificial neural network algorithm.

The storage unit 120 may include, for example, an internal memory or an external memory. The internal memory, for example, may include at least one of a volatile memory (e.g., a dynamic RAM (DRAM), a static RAM (SRAM), a synchronous dynamic RAM (SDRAM), etc.), or a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, a NOR flash, etc.), a hard drive, or a solid state drive (SSD).

The external memory may further include a flash drive, for example, a compact flash (CF), a secure digital (SD), a micro-secure digital (micro-SD), a mini-secure digital (mini-SD), an extreme digital (XD), a multi-media card (MMC), a memory stick, or the like. The external memory may be functionally and/or physically connected to an electronic device through various interfaces.

According to the embodiment of the present invention, the storage unit 120 may match and store processed data (data obtained by reducing a size of original image data by a predetermined ratio, or data obtained by reducing the size of the original image data and enlarging the original image data to an original data size) obtained by processing image data (e.g., photographs and video data) received from the user device (the administrator device) or other web servers, and original data corresponding to the processed data. Each of the original data and the processed data may be used to extract information on a grid phenomenon that occurs when a resolution is reduced.

In addition, the storage unit 120 may store a neural network file that is data for restoring the resolution to an original image level by extracting information on the grid phenomenon and removing a grid existing in the processed data through an artificial intelligence algorithm (e.g., SRCNN).

The control unit 130 may also be referred to as a processor, a controller, a microcontroller, a microprocessor, a microcomputer, or the like. Meanwhile, the control unit may be implemented by hardware or firmware, software, or a combination thereof.

In a case of the implementation by the firmware or the software, one embodiment of the present invention may be implemented in the form of a module, a procedure, a function, and the like for performing functions or operations described above. A software code may be stored in a memory so as to be operated by the control unit. The memory may be located inside or outside the user terminal and the server, and may transmit and receive data to and from the control unit through various known devices.

According to the embodiment of the present invention, the control unit 130 may generate a universal neural network file that is a file required for improving a resolution of image data through a computation based on an artificial neural network.

The control unit 130 may include a material processing unit 131, a neural network learning unit 132, a result evaluation unit 133, and a usage pattern calculation unit 134.

First, the material processing unit 131 may collect and process a learning material necessary for calculating the universal neural network file required for improving image quality of video data. The material processing unit 131 may perform a primary change (a reduction change) and a secondary change (enlargement of size-reduced image data) of the collected material. A more detailed description of operations performed by the material processing unit 131 will be given with reference to FIG. 4.

The neural network learning unit 132 may perform a neural network learning operation based on artificial intelligence on that basis of the processed data calculated after the operation of collecting and processing the material performed by the material processing unit 131. The neural network learning unit 132 may perform a parameter setting operation and a neural network file calculation operation required for a learning process. A more detailed description of the neural network learning unit 132 will be given with reference to FIG. 5.

The result evaluation unit 133 may perform an operation of evaluating a result value obtained by applying the universal neural network file calculated by the neural network learning unit 132 to the user device 200.

In detail, the result evaluation unit 133 may determine an improvement degree of a resolution of result data to which the neural network file is applied by the user device 200. In addition, the result evaluation unit 133 may determine an error rate between the result data to which the neural network file is applied and the original data. In this case, a unit of comparison between the result data and the original data may be each frame constituting a video, or may be a unit of fragments divided for transmitting the video.

Alternatively, according to various embodiments, each video data may be divided into a plurality of frame bundles based on image identity (e.g., when one image is displayed over 100 frames, the 100 frames may be set as one frame bundle, and a plurality of such frame bundles may be set). Accordingly, the unit of comparison between the result data and the original data may be a bundle unit divided based on the image identity.

Furthermore, when the error rate between the result data and the original data is determined to be a reference value or more, the result evaluation unit 133 may request correction of weight and bias values constituting the neural network file. In other words, the result evaluation unit 133 may determine whether to modify a parameter constituting the neural network file through comparing the original data with the result data.

According to one embodiment, the result evaluation unit 133 may calculate importance for each image object required for understanding the video from the original data. In addition, when it is determined that an error rate of one unit (e.g., one frame, one frame bundle, etc.) between the original data and the result data (data obtained by applying the neural network file by the user device 200 to improve the resolution) is greater than or equal to a preset value while an image object that is greater than or equal to a preset value is included in the one unit, the weight and bias values constituting the neural network file may be requested to be modified.

Values of the importance for each image object may be calculated based on a size ratio occupied by one image object within one frame, a repetition ratio of the image object, and the like.

According to various embodiments, the result evaluation unit 133 may calculate the importance for each image object based on a content characteristic of the video data. First, the result evaluation unit 133 may check the content characteristic of the video data. In this case, a content characteristic of a private-interest video data may be calculated by the material processing unit 131. For example, the content characteristic of the video data may be calculated based on information on a path through which the video data is uploaded to the server 100 (e.g., a folder name selected when a corresponding video file is uploaded to the server 100 by a user or an administrator), a content genre, a field, and the like input when the corresponding video file is uploaded to the server 100 by the user or the administrator. In addition, the calculated content characteristic of the video data may be managed as metadata of corresponding video data.

Accordingly, the result evaluation unit 133 may check content characteristic information of each video data extracted and stored when the video data is uploaded to the server 100, so that the importance for each image object may be calculated based on the content characteristic information. For example, the result evaluation unit 133 may classify items of an image object into a person face object, a text object (e.g., a subtitle), a thing object, and the like, and may determine each object item that matches the content characteristic information (e.g., the person face object may match drama contents).

The usage pattern calculation unit 134 may calculate a usage pattern for a VOD service of the user based on a streaming request record and a download record of the user, user information calculated by and transmitted from the user device 200, and the like.

The usage pattern calculation unit 134 may calculate items such as a preferred genre, a preferred content characteristic, a main streaming request time zone, and a main viewing device of the user as usage patterns. The usage pattern calculation unit 134 may recommend a screen mode suitable for the user based on calculated usage pattern information of the user. According to various embodiments, the neural network file for improving the image quality may be used for general purposes, or may be calculated as a file classified according to a screen mode (e.g., a movie size mode, a subtitle-oriented mode, a specific color (RGB) enhancement mode, a person-oriented resolution improvement mode, etc.) of the result data. In other words, the user may perform resolution improvement by downloading one universal neural network file suitable for a usage pattern of the user among a plurality of neural network files for each screen mode that may be provided to the user device 200 by the server 100. To this end, the usage pattern calculation unit 134 may calculate a usage pattern for each user, and may separately manage information on the calculated usage pattern for each user. Subsequently, when streaming is requested by a corresponding user, a neural network file in a mode suitable for a usage pattern of the corresponding user may be generated, and the generated neural network file may be provided.

According to various embodiments, a universal neural network file suitable for the usage pattern of the user may be automatically set based on the usage pattern information of the user calculated by the usage pattern calculation unit 134 of the server 100, and may be set based on a screen mode selected by the user.

Figure 4:
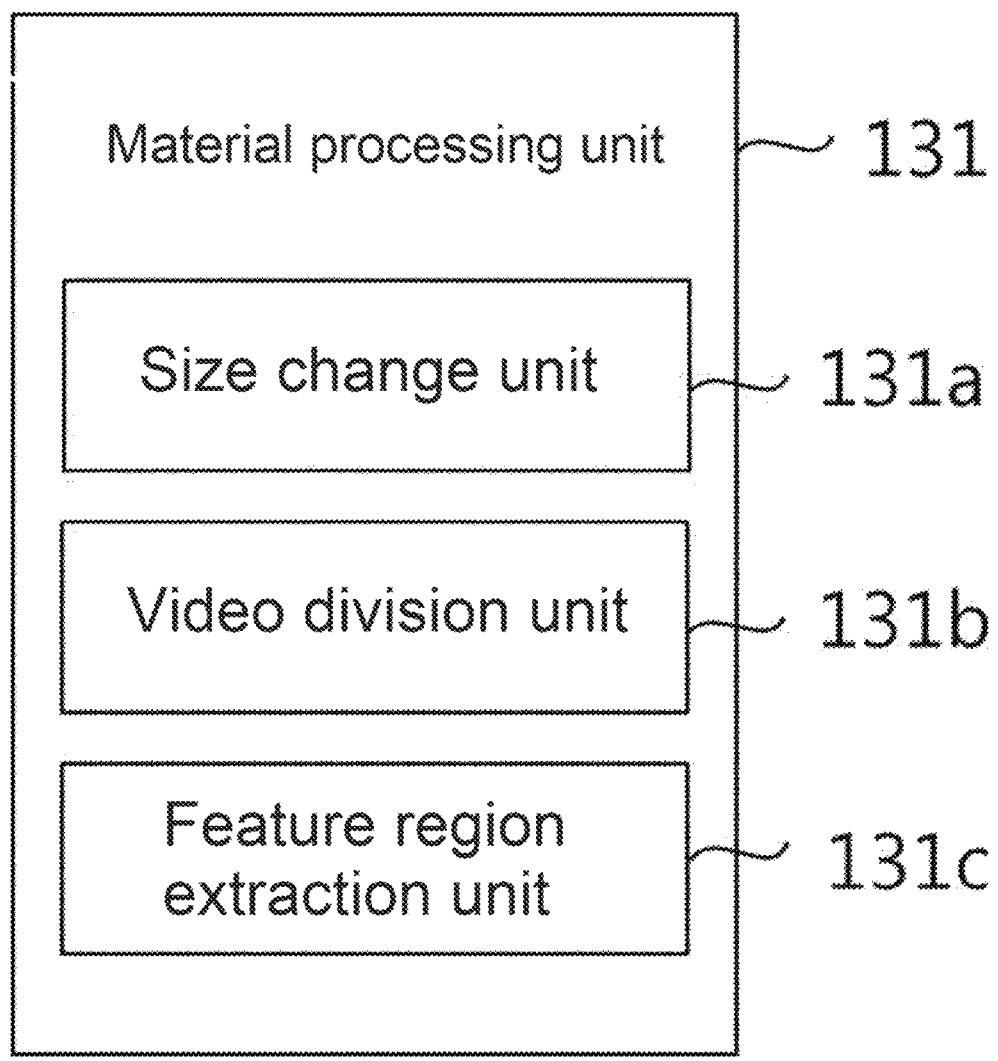
FIG. 4 is a view showing a configuration of a material processing unit according to an embodiment of the present invention.

FIG. 4 is a view showing a configuration of a material processing unit according to an embodiment of the present invention.

As shown in FIG. 4, according to the embodiment of the present invention, the material processing unit 131 may include a size change unit 131a, a video division unit 131b, and a feature region extraction unit 131c.

In order to calculate the neural network file for improving the image quality of the video data, an input material to be input to an input layer, a feature value of an input target material, or the like has to be prepared in the neural network learning unit. The material processing unit 131 may prepare data and material to be input to the input layer.

First, the size change unit 131a may perform a primary change operation of reducing a size of an image constituting the video data from an original size by a preset value, and a secondary change operation of enlarging an image resulting from the primary change operation to correspond to the original size. A size change operation performed by the size change unit 131a will be described with reference to FIG. 6.

Figure 6:
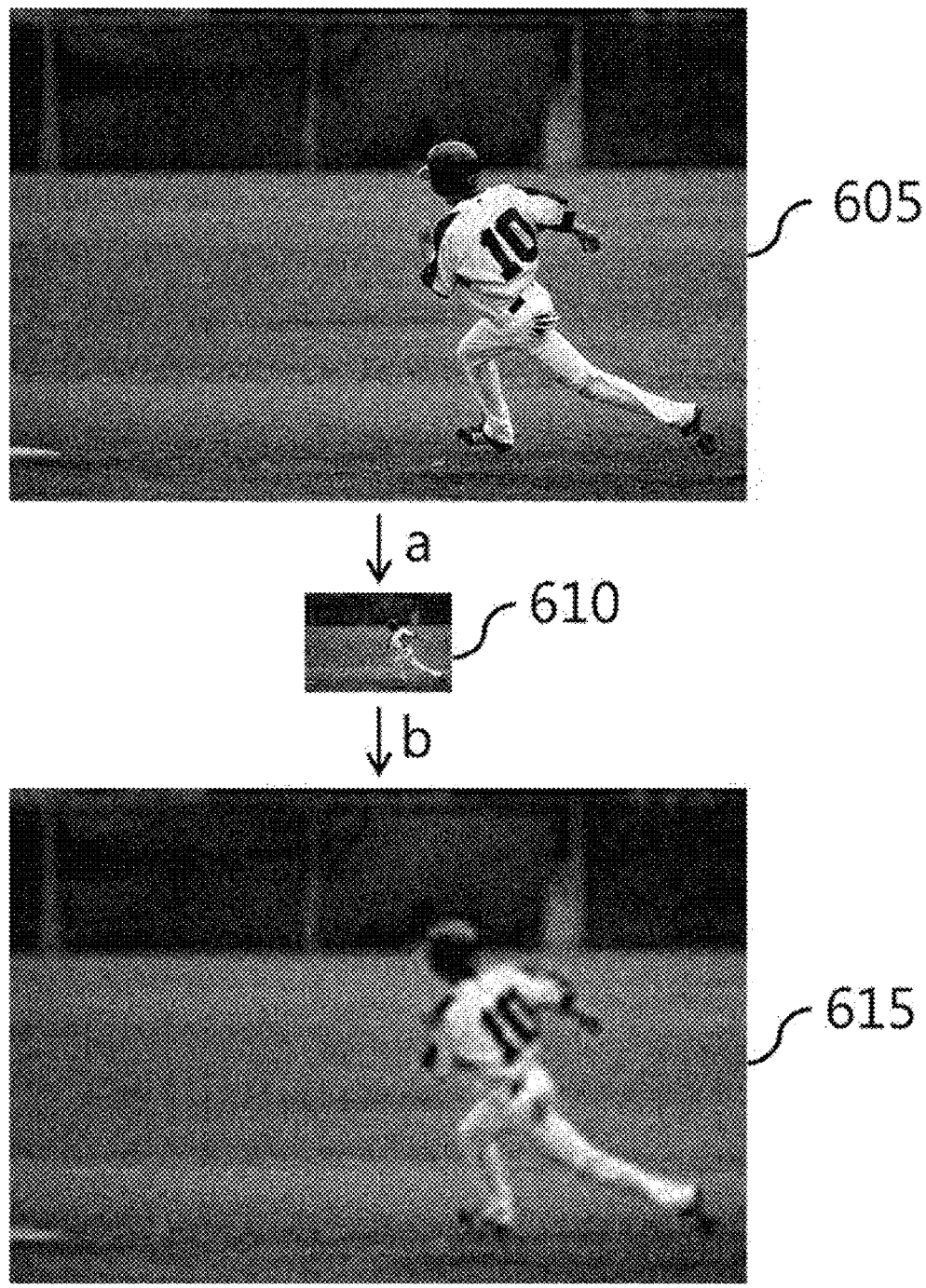
FIG. 6 is a view showing an example of a size change operation performed by a size change unit according to an embodiment of the present invention.

FIG. 6 is a view showing an example of a size change operation performed by a size change unit according to an embodiment of the present invention.

As shown in FIG. 6, the size change unit 131a may perform an operation a, which is a primary change operation of reducing a size of an original image 605 by a predetermined ratio, and may perform an operation b, which is a secondary change operation of enlarging a size-reduced image 610 calculated as a result of the operation a to have the same size as the original image. Unlike the original image 605, an image 615 generated after a processing operation (the primary change operation a and the secondary change operation b) may have a reduced resolution, which is caused because only a size is enlarged without increasing a numerical value of pixels constituting the image.

When comparing the image 615 (having the same resolution as the image 610) with the original image 605, it may be found that the image 615 has an increased pixel size so that a grid having a mosaic shape is generated.

According to the embodiment of the present invention, the server 100 may perform neural network learning based on the original image 605 and a processed image 615 in order to convert a resolution level from the image 615 having low quality to the original image 605. To this end, the size change unit 131a of the material processing unit 131 may perform a primary change operation of reducing a size of the original image by a preset value, and a secondary change operation of enlarging the size-reduced image generated by the primary change operation to have the same size as the original image. In addition, the material processing unit 131 may perform an operation of extracting the original image and the processed image generated by the primary change operation and the secondary change operation as learning data.

According to various embodiments, before performing the neural network learning, the material processing unit 131 may extract pattern information (position information, color information, etc.) of a grid generated in the processed image (an image in which a size is enlarged after being reduced), and may use data on the extracted pattern information as input data for the neural network learning.

The video division unit 131b may perform an operation of dividing video data retained by the server 100 based on a preset condition. In this case, the video division unit 131b may perform an operation of dividing the video data based on the number of frames. Alternatively, the video division unit 131b may divide the video data into bundles (chunks) by grouping frames having a matching rate that is greater than or equal to a preset matching rate based on a matching rate of an image object. For example, a division unit may be a unit in which the same person is photographed. In addition, when a streaming service is provided from the server 100 to the user device 200, the video division unit 131b may divide the video data into a plurality of chunks in a unit transmitted to the user device 200.

The chunks divided by the video division unit 131b may be used when results of artificial intelligence neural network learning and the resolution improvement are evaluated.

The feature region extraction unit 131c may perform an operation of extracting a feature region including a feature image based on each frame or division unit of the video data. The feature region extraction unit 131c may determine a presence of an image region that satisfies a preset feature region requirement in each frame or division unit. The feature region requirement may include, for example, a region in which an image object that is determined to have importance greater than or equal to a preset value exists. For example, the feature region extraction unit 131c may set the importance of the image object to be high with respect to a face image of a protagonist in drama contents, so that a feature region may be set as a region in which the face image of the protagonist is displayed (e.g., a Nuki region; an object display region separated from a background).

In addition, the feature region extraction unit 131c may perform an operation of extracting a specific frame or a specific division unit among all frames or images of the video data as well as the feature region within the image.

A learning importance weight may be set for the feature region extracted by the feature region extraction unit 131c so as to increase the number of repetitions of learning.

Figure 5:
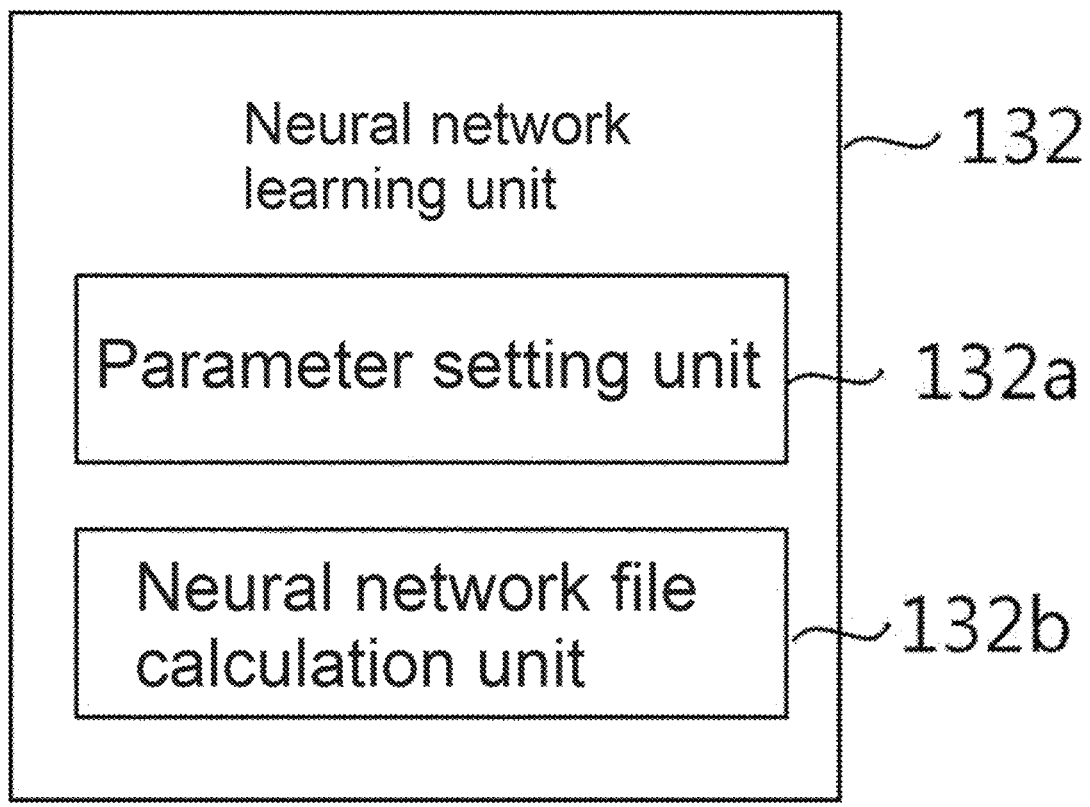
FIG. 5 is a view showing a configuration of a neural network learning unit according to an embodiment of the present invention.

FIG. 5 is a view showing a configuration of a neural network learning unit according to an embodiment of the present invention.

As shown in FIG. 5, according to the embodiment of the present invention, the neural network learning unit 132 may include a parameter setting unit 132a and a neural network file calculation unit 132b.

In addition, the neural network learning unit 132 may perform a deep-learning learning process based on the artificial neural network so as to generate the neural network file that is a file required for improving image quality of video data with a low resolution.

The deep-learning learning operation based on the artificial neural network will be briefly described with reference to FIG. 7.

Figure 7:
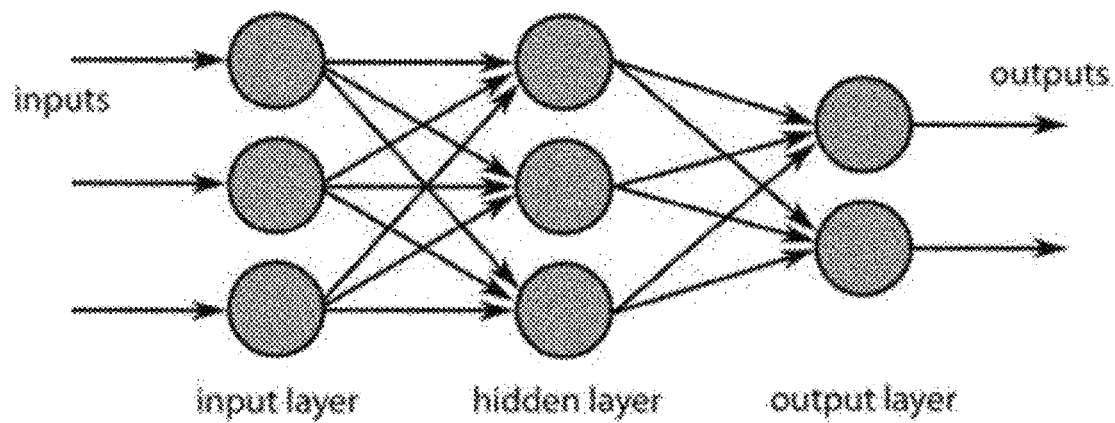
FIG. 7 is a view for explaining an example of a deep-learning learning operation according to an embodiment of the present invention.

FIG. 7 is a view for explaining an example of a deep-learning learning operation according to an embodiment of the present invention.

Referring to FIG. 7, a perceptron, which is a neural network model including an input layer, a hidden layer, and an output layer, is disclosed. According to one embodiment, the neural network learning disclosed in the present disclosure may be performed by using a multilayer perceptron implemented to include at least one hidden layer. Basically, the perceptron may receive a plurality of signals to output one signal.

A weight and a bias required in a computation process using an artificial neural network model may be calculated to be appropriate values through a backpropagation technique. According to the embodiment of the present invention, an artificial neural network learning process may extract appropriate weight data and appropriate bias data through such a backpropagation technique. In the present invention, the neural network file calculated through the artificial neural network to perform the resolution improvement may include extracted information on the appropriate weight data and the appropriate bias data.

Since parameter correction and a learning scheme through the artificial neural network performed through the backpropagation technique are known techniques, detailed descriptions thereof will be omitted.

Preferably, according to the embodiment of the present invention, the neural network learning unit 132 may perform learning by using a convolution neural network (CNN) model among artificial neural network models. In a case of CNN, there are characteristics that: a form of input/output data of each layer is maintained; a feature with an adjacent image is effectively recognized while spatial information of an image is maintained; a feature of an image is extracted and learned with a plurality of filters; and the like.

A basic CNN operation scheme may use a scheme of scanning a partial region of one image one by one through a filter, and performing learning while retrieving a value for the partial region. In this case, an objective of the CNN may be to retrieve a filter having an appropriate weight value. In the CNN, the filter may be generally defined as a square matrix such as (4,4) or (3,3). According to the embodiment of the present invention, a setting value of the filter for the CNN is not limited. The filter may calculate a convolution while circulating the input data at a predetermined interval.

According to the embodiment of the present invention, the parameter setting unit 132a may set an initial parameter value for performing a learning process for video data through the CNN.

According to various embodiments, the parameter setting unit 132a may determine a frame size of the original data, a reduction ratio set to the original data when the processed data is generated, and the like, and may set initial parameters corresponding thereto.

In addition, according to various embodiments, the parameter setting unit 132a may specify a type of image data required for artificial neural network learning, and may request to input the image data as learning data. For example, the parameter setting unit 132a may determine whether a learning importance weight for each genre is set, and may additionally request an image to which the learning importance weight is set before a corresponding learning operation is completed. In detail, in a case of contents having a high proportion of a person, such as a drama or a movie, the parameter setting unit 132a may additionally request frame information including a related image object as the learning data in order to repeatedly perform the learning on a major person.

The neural network file calculation unit 132b may perform an operation of inputting and learning the material processed by the material processing unit 131 to a preset artificial neural network model. In this case, the neural network file calculation unit 132b may input the original data and the processed data (having a sized reduced by a preset ratio) to a CNN algorithm to extract information (grid generation pattern information) on a grid generated in a process of changing the original data into the processed data. In more detail, the grid generation pattern information calculated by the neural network file calculation unit 132b may be calculated based on a difference between the original data and the processed data, and may include a position of the grid, pattern information on a color change of the grid, and the like.

The neural network file calculation unit 132b may generate a neural network file required for restoring the image to the original data by removing the grid from the processed data based on the calculated grid generation pattern information. The neural network file calculation unit 132b may terminate the learning process of one data when a resolution of data, which is output as a result of performing a computation by inputting low-quality video data (the processed data) to the artificial neural network algorithm as input data, has a match rate greater than or equal to a preset value with the original data. Similarly, the neural network file calculation unit 132b may repeatedly perform an operation of inputting various types of processed data to the input layer and determining the matching rate with the original data as a result of an artificial neural network computation.

According to various embodiments, the neural network file calculation unit 132b may calculate grid generation pattern information generated when a size of an image having a specific size is reduced by inputting various types of original data and processed data. Accordingly, the neural network file calculation unit 132b may calculate grid generation pattern information that is commonly generated when a size of an image is reduced in various images as well as in a specific image.

When the processed data is input to the input layer, and a match rate between output data and the original data is greater than or equal to a preset value, the neural network file calculation unit 132b may generate a neural network file, including information such as an activation function for each layer and parameters (a weight, a bias, a learning rate, etc.) set in a corresponding artificial neural network algorithm.

In other words, when the neural network file calculated by the neural network file calculation unit 132b is transmitted to the user device 200, the user device 200 may receive the neural network file to perform an artificial neural network test on the low-quality video data on the basis of information based on the neural network file, so that a function of improving the resolution of the video data may be performed.

Figure 8:
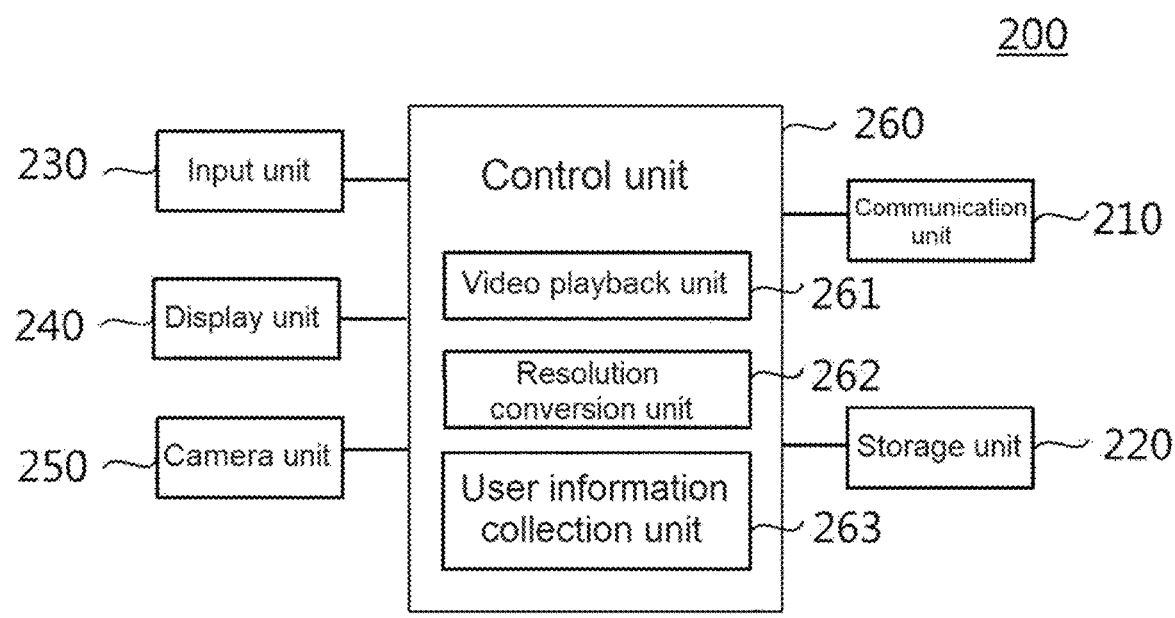
FIG. 8 is a view showing a configuration of a user device according to an embodiment of the present invention.

FIG. 8 is a view showing a configuration of a user device according to an embodiment of the present invention.

According to the embodiment of the present invention, as shown in FIG. 8, the user device 200 may include a communication unit 210, a storage unit 220, an input unit 230, a display unit 240, a camera unit 250, and a control unit 260. In addition, the control unit 260 may include a video playback unit 261, a resolution conversion unit 262, and a user information collection unit 263.

According to the embodiment of the present invention, the communication unit 210 may perform a communication function for receiving the neural network file and the video data from the server 100. Furthermore, the communication unit 210 may perform a communication operation for transmitting feedback information collected by the user device 200 to the server 100.

According to the embodiment of the present invention, the storage unit 220 may store the neural network file and the video data received from the server 100. According to various embodiments, the storage unit 220 may store or temporarily store result data (data with improved resolution) that is a result value obtained by applying the neural network file to low-quality data having a resolution less than or equal to a preset reference value and operating a computation of the artificial neural network algorithm.

The storage unit 220 may store generated feedback information. Alternatively, the storage unit 220 may store information required for calculating feedback information. For example, when one frame is extracted so as to be provided as the feedback information among the result data (the data with improved resolution) generated as a result of the computation of the artificial neural network algorithm, reference information for the extraction (e.g., a presence of a grimacing face of the user detected during video playback, and contents obtained by extracting a frame at a time point at which the grimacing face is detected) may be stored.

The input unit 230 may receive user selection information related to a content genre, a content name, and the like.

When the video data received from the server 100 or the result data after a resolution improvement operation of the video data is played back, the display unit 240 may display a playback screen of a corresponding video.

The camera unit 250 may take a photograph and a video in response to a user request. The camera unit 250 may upload image information such as the taken photograph and video to the server 100 or other web servers. Alternatively, the image information obtained through the camera unit 250 may be transmitted to another user device.

When the image information such as a photograph and a video is obtained, first, the camera unit 250 may determine a resolution based on the user request. According to one embodiment, the camera unit 250 may reduce a resolution of the taken photograph or video to a preset level or less and store the resolution-reduced photograph or video based on whether a universal neural network file for improving image quality is mounted.

According to various embodiments, the camera unit 250 may operate a camera for regularly photographing a face of the user according to a preset reference interval while playing back the result data with improved resolution. A facial expression of the user or a presence of a forehead grimace may be determined, and feedback information corresponding thereto may be extracted.

The control unit 260 may perform resolution conversion and playback of a video file downloaded from the server 100. In detail, the control unit 260 may include a video playback unit 261, a resolution conversion unit 262, and a user information collection unit 263.

First, according to the embodiment of the present invention, the video playback unit 261 may control the display unit 240 to display the video file by playing back the video file. The video playback unit 261 may determine a resolution of video data requested to be output. When a resolution of video data requested to be executed is determined to be less than or equal to a preset level so that the resolution improvement is required, the video playback unit 261 may request the resolution improvement to the resolution conversion unit 262. Thereafter, the video playback unit 261 may play back a file having a resolution improved through the resolution conversion unit 262.

The resolution conversion unit 262 may determine a resolution level of current image data (a photograph and a video) and a target resolution level requested by the user. In this case, the resolution conversion unit 262 may determine a presence of the neural network file, and may download a universal neural network file from the server 100 by a request to the server 100 when the neural network file does not exist. Thereafter, the resolution conversion unit 262 may perform an operation of converting low-quality data to have a resolution of a desired level by operating the artificial neural network algorithm based on the universal neural network file.

The user information collection unit 263 may collect user information for feedback. The user information collection unit 263 may select and store a frame to be used as feedback information among the result data after the resolution improvement is performed based on the artificial neural network algorithm. For example, the user information collection unit 263 may acquire face information of the user while the video data with improved resolution is played back by the user, and when an event such as a forehead grimace of the user occurs, information on a video frame displayed at the time when the event occurs may be collected.

In addition, the user information collection unit 263 may collect content information such as an item or a genre of contents that are played back to the extent greater than or equal to a reference value. For example, the user information collection unit 263 may determine a playback frequency of an animation compared to a documentary (based on a photographic image), a playback frequency of contents without a subtitle compared to contents with a subtitle, and the like, and may collect information on the determined playback frequencies. The playback information collected by the user information collection unit 263 may be provided to the server 100, and the server 100 may calculate the usage pattern information of the user based on the provided playback information.

FIG. 9 is a view showing a process of generating and transmitting a neural network file for improving image quality according to an embodiment of the present invention.

According to the embodiment of the present invention, as shown in FIG. 9, the server 100 may generate the universal neural network file for improving a resolution and transmit the generated universal neural network file to the user device 200.

In detail, first, the server 100 may perform an operation 705 of processing acquired video data. The operation 705 may be an operation for generating data to be trained in the artificial neural network algorithm, and may perform processing of reducing an image size of video data in order to generate data suitable for learning.

According to one embodiment, the operation 705 may be a processing operation (size reduction) for each frame constituting a video file. Alternatively, the operation 705 may be an operation of selecting a frame to be input for the artificial neural network learning through sampling for each division unit of the video file, and performing processing on the frame (size reduction by multiplying a preset ratio). For example, in a case of a video file with a total of 2400 frames, assuming that the video file includes 100 chunks in which 24 frames are defined as one unit that is a chunk, the server 100 may sample one frame per a corresponding video division unit so as to process a total of 100 frames as learning data.

After the operation 705, the server 100 may perform an operation 710 of acquiring grid generation pattern information based on processed video data. The processed video data may refer to data obtained by reducing a size of original data (only data having a preset resolution level or higher is designated as original data for the learning) by a preset ratio.

When a size of one image is reduced, the number of pixels to be displayed in the same area may be reduced, so that the resolution may be automatically reduced. Accordingly, when the image size is reduced, a reduced resolution level is maintained even if the image size is subsequently enlarged to an original image size, so that a grid phenomenon may occur.

The server 100 may obtain information on a pattern in which a grid is generated by comparing an original image with a processed image in which the grid phenomenon has occurred. The obtained grid generation pattern information may be subsequently used to restore the resolution by removing the grid from an image in which the grid phenomenon has occurred.

After the operation 710 of acquiring the grid generation pattern information, the server 100 may perform an operation 715 of generating a neural network file for improving image quality based on the grid generation pattern information. The neural network file may be generated so as to be universally applicable regardless of a type of contents. To this end, the neural network file may be trained by using various types of images and contents. In addition, the server 100 may generate the neural network file by calculating artificial neural network algorithm information (an activation function applied for each layer, a weight, a bias, etc.) required for restoring the original image by removing the grid from low-quality image data in which the grid is generated.

Factors such as a weight and a bias provided as result values may be determined based on a match rate between original image data and a final calculation result (data with improved image quality). When the matching rate is greater than or equal to a preset level, the server 100 may determine information on the weight and the bias applied upon a corresponding artificial neural network computation as information to be included in the universal neural network file.

Thereafter, the server 100 may perform an operation 720 of confirming that a streaming request (or a download request) for the video data is received from the user device 200. In response to a user request, the server 100 may perform an operation 725 of transmitting a low-quality version of the requested video data to the user device 200 together with the generated neural network file for improving the image quality. Accordingly, since the user device 200 receives a low-quality version of a video, contents may be received in a relatively easy way without being restricted by a network environment, and a high-quality video at a level desired by the user may be played back through applying the universal neural network file, which is received together with the low-quality version of the video data, to the received low-quality version of the video data.

Although not shown in the drawing, according to various embodiments, the user device 200 may transmit feedback information on a state of the video data, which has been played back or converted, to the server 100. Accordingly, the user device 200 may calculate playback-related information for each user, such as a content genre, a content characteristic, and a major playback request time zone of contents played back at a frequency greater than or equal to a reference value, and may transmit the calculated playback-related information to the server 100.

Furthermore, the user device 200 may provide a frame sample of the result data obtained by completing the resolution improvement operation to the server 100 according to a preset period. Accordingly, the server 100 may compare a result data frame calculated after the resolution improvement operation that is received from the user device 200 with an original data frame of the same contents. The transmitted frame information may include playback position information in the contents so as to be transmitted, so that the server 100 may search for a comparison target frame image in the original data.

The server 100 may compare an image frame provided for feedback from the user device 200 with an original image frame of corresponding contents, and determine the match rate. In addition, when the matching rate is determined to be less than or equal to a preset reference value, a relearning operation for updating the neural network file may be requested, and accordingly, the relearning operation may be performed.

Meanwhile, the neural network file generated according to various embodiments of the present invention may be compressed as necessary. As one embodiment, the server 100 may compress the neural network file in consideration of the performance of the user device 200, and transmit the compressed neural network file to the user device 200.

The neural network file may be compressed by using at least one of pruning, quantization, decomposition, and knowledge distillation. The pruning is one of compression techniques for removing a weight and a bias that are meaningless or that do not significantly affect an output value among weights and biases of the neural network file. The quantization is one of compression techniques for quantizing each weight into a preset bit. The decomposition is one of compression techniques for reducing a size of the weight by linearly decomposing (approximated decomposition) a weight matrix or a tensor, which is a set of weights. The knowledge distillation is one of compression techniques for generating and training a student model smaller than an original model by using the original model as a teacher model. In this case, the student model may be generated through the pruning, the decomposition, or the quantization described above.

In this case, a degree of compression according to the performance of the user device 200 may be determined through various schemes. As one embodiment, a degree of compression of the neural network file may be determined based on a simple specification of the user device 200. In other words, the degree of compression may be collectively determined by specifications of a processor and a memory of the user device 200.

As another embodiment, the degree of compression of the neural network file may be determined based on a use state of the user device 200. In detail, the server 100 may receive use state information from the user device 200, and acquire available resource information of the user device 200 according to the received use state information. The server 100 may determine the degree of compression of the neural network file based on the available resource information of the user device 200. In this case, the available resource information may be information on an application being executed by the user device 200, a CPU or GPU occupancy rate determined according to the application being executed, and information related to an amount of memory that may be stored in the user device 200.

Although the present invention has been described in detail with reference to the above-described examples, modifications, changes, and variations may be made to the examples by those skilled in the art without departing from the scope of the present invention. In short, it is not necessary to separately include all functional blocks shown in the drawings or to follow all sequences shown in the drawings in a shown order to achieve effects intended by the present invention, and it is to be noted that those cases may fall within the technical scope of the present invention as described in the claims.

The invention claimed is:

1. A resolution improvement system comprising:
  a server for performing a service for transmitting requested video data to a user device in response to a request from the user device, generating a universal neural network file required for an operation of an artificial neural network algorithm for improving a resolution of image information based on retained video data, and transmitting the generated universal neural network file and low-quality video data, which has a resolution changed to a preset level or less, to the user device; and
  the user device for performing a computation operation based on the artificial neural network algorithm in which the received universal neural network file is applied to the low-quality video data received from the server, improving the resolution of the low-quality video data according to the computation operation, and playing back the video data with improved resolution,
  wherein the server includes a control unit for generating the universal neural network file that is a file required for improving a resolution of image data through a computation based on an artificial neural network, and
  wherein the control unit includes a material processing unit for collecting and processing a learning material necessary for calculating the universal neural network file required for improving image quality of the video data, and wherein the material processing unit includes:
  a size change unit for reducing a size of an image constituting the video data from an original size by a preset ratio to generate processed data in which a grid is generated due to resolution reduction;
  a video division unit for dividing frames in the video data based on a matching rate of an image object; and
  a feature region extraction unit for extracting a feature region for each division unit of the video data, in which a region for displaying the image object is extracted as the feature region when importance of the image object included in the frame is greater than or equal to a preset value.

2. The resolution improvement system of claim 1, wherein the control unit includes a neural network learning unit, and wherein the neural network learning unit includes:
  a parameter setting unit for setting an initial parameter required for a computation of the artificial neural network algorithm; and
  a neural network file calculation unit for calculating generation pattern information of a grid generated in a process of reducing a size of original data by comparing the original data with processed data, which is obtained through reducing a resolution by reducing the size of the original data, calculating an artificial neural network parameter required for removing the grid on the processed data based on the grid generation pattern information, and generating a neural network file including the calculated parameter.

3. The resolution improvement system of claim 1, wherein the control unit includes a result evaluation unit for determining an improvement degree of a resolution of result data to which the neural network file is applied by the user device, and determining whether to modify a parameter constituting the neural network file based on an error rate between the result data and predetermined original data stored therein.

4. The resolution improvement system of claim 1, wherein the control unit includes a usage pattern calculation unit for calculating and storing a usage pattern for a VOD service of a user based on a streaming request record and a download record of the user.

5. The resolution improvement system of claim 1, wherein the user device includes:
  a video playback unit for determining a resolution of video data requested to be output, and requesting resolution conversion when a resolution of video data requested to be executed is determined to be less than or equal to a preset level so that resolution improvement is required; and
  a resolution conversion unit for determining a presence of the neural network file, downloading the universal neural network file by a request to the server when the universal neural network file does not exist, and converting the low-quality data to have a requested resolution by operating the artificial neural network algorithm based on the universal neural network file.

6. A resolution improvement system comprising:
  a server for performing a service for transmitting requested video data to a user device in response to a request from the user device, generating a universal neural network file required for an operation of an artificial neural network algorithm for improving a resolution of image information based on retained video data, and transmitting the generated universal neural network file and low-quality video data, which has a resolution changed to a preset level or less, to the user device; and
  the user device for performing a computation operation based on the artificial neural network algorithm in which the received universal neural network file is applied to the low-quality video data received from the server, improving the resolution of the low-quality video data according to the computation operation, and playing back the video data with improved resolution,
  wherein the server includes a control unit for generating the universal neural network file that is a file required for improving a resolution of image data through a computation based on an artificial neural network, and
  wherein the control unit includes a neural network learning unit, and wherein the neural network learning unit includes:

a parameter setting unit for setting an initial parameter required for a computation of the artificial neural network algorithm; and a neural network file calculation unit for calculating generation pattern information of a grid generated in a process of reducing a size of original data by comparing the original data with processed data, which is obtained through reducing a resolution by reducing the size of the original data, calculating an artificial neural network parameter required for removing the grid on the processed data based on the grid generation pattern information, and generating a neural network file including the calculated parameter.

7. The resolution improvement system of claim 6, wherein the control unit includes a material processing unit for collecting and processing a learning material necessary for calculating the universal neural network file required for improving image quality of the video data, and wherein the material processing unit includes:

a size change unit for reducing a size of an image constituting the video data from an original size by a preset ratio to generate processed data in which a grid is generated due to resolution reduction;

a video division unit for dividing frames in the video data based on a matching rate of an image object; and a feature region extraction unit for extracting a feature region for each division unit of the video data, in which a region for displaying the image object is extracted as the feature region when importance of the image object included in the frame is greater than or equal to a preset value.

8. The resolution improvement system of claim 6, wherein the control unit includes a result evaluation unit for determining an improvement degree of a resolution of result data to which the neural network file is applied by the user device, and determining whether to modify a parameter constituting the neural network file based on an error rate between the result data and predetermined original data stored therein.

9. The resolution improvement system of claim 6, wherein the control unit includes a usage pattern calculation unit for calculating and storing a usage pattern for a VOD service of a user based on a streaming request record and a download record of the user.

10. The resolution improvement system of claim 6, wherein the user device includes:

a video playback unit for determining a resolution of video data requested to be output, and requesting resolution conversion when a resolution of video data requested to be executed is determined to be less than or equal to a preset level so that resolution improvement is required; and a resolution conversion unit for determining a presence of the neural network file, downloading the universal neural network file by a request to the server when the universal neural network file does not exist, and converting the low-quality data to have a requested resolution by operating the artificial neural network algorithm based on the universal neural network file.

\* \* \* \* \*